United States Patent
Baranowski et al.

(10) Patent No.: US 9,563,626 B1
(45) Date of Patent: Feb. 7, 2017

(54) OFFLINE MANAGEMENT OF DATA CENTER RESOURCE INFORMATION

(75) Inventors: Matthew Paul Baranowski, Seattle, WA (US); Jacob Gabrielson, Seattle, WA (US); Zachary J. Hansen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 13/315,071

(22) Filed: Dec. 8, 2011

(51) Int. Cl.
*G06F 17/30* (2006.01)

(52) U.S. Cl.
CPC ..................... *G06F 17/30* (2013.01)

(58) Field of Classification Search
CPC ................... G06F 9/50; G06F 17/30
USPC ......................................... 715/234
See application file for complete search history.

(56) References Cited

U.S. PATENT DOCUMENTS

| | | | | |
|---|---|---|---|---|
| 5,640,002 | A * | 6/1997 | Ruppert et al. | 235/462.46 |
| 5,878,258 | A * | 3/1999 | Pizi et al. | 719/320 |
| 5,959,275 | A * | 9/1999 | Hughes | G06K 17/0022 |
| | | | | 235/375 |
| 6,502,205 | B1 * | 12/2002 | Yanai et al. | 714/6.32 |
| 7,747,576 | B2 * | 6/2010 | Micka | 707/646 |
| 7,752,166 | B2 * | 7/2010 | Quinlan et al. | 707/613 |
| 7,814,234 | B2 * | 10/2010 | Hawkins et al. | 709/250 |
| 8,627,230 | B2 * | 1/2014 | Boehler | G06F 3/0237 |
| | | | | 704/231 |
| 8,936,198 | B1 * | 1/2015 | Eddey et al. | 235/492 |
| 2008/0201245 | A1 | 8/2008 | Eren et al. | |
| 2009/0284367 | A1 | 11/2009 | Pfafman et al. | |
| 2010/0049576 | A1 * | 2/2010 | Wilson | G06Q 10/06 |
| | | | | 705/7.14 |
| 2012/0079562 | A1 * | 3/2012 | Anttila et al. | 726/3 |
| 2012/0272338 | A1 * | 10/2012 | Falkenburg et al. | 726/30 |
| 2014/0052676 | A1 * | 2/2014 | Wagner et al. | 706/13 |

OTHER PUBLICATIONS

Office action for U.S. Appl. No. 13/315,056, mailed on Jun. 27, 2014, Baranowski et al., "System-Directed Equipment Receiving for Data Centers", 7 pages.
Office action for U.S. Appl. No. 13/315,056, mailed on Aug. 7, 2014, Baranowski et al., "System-Directed Equipment Receiving for Data Centers", 8 pages.
Final Office Action for U.S. Appl. No. 13/315,056, mailed on Jan. 7, 2015, Matthew Paul Baranowski, "System-Directed Equipment Receiving for Data Centers", 12 pages.
Office Action for U.S. Appl. No. 13/315,056 mailed on Jun. 11, 2015, Matthew Paul Baranowski, "System Directed Equipment Receiving for Data Centers", 12 pages.

* cited by examiner

*Primary Examiner* — Kavita Padmanabhan
*Assistant Examiner* — Tionna Burke
(74) *Attorney, Agent, or Firm* — Lee & Hayes, PLLC

(57) ABSTRACT

Techniques for managing resources within a data center include using a portable device for interaction with technicians. The portable device has a web browser that the technician uses to navigate to an administrative web site from which a browser-based application is downloaded. The application is executed by the browser and maintains a browser-based data store that is asynchronously synchronized with a back-end data store when network communications are available.

27 Claims, 4 Drawing Sheets

OFFLINE MANAGEMENT OF DATA CENTER RESOURCE INFORMATION

BACKGROUND

It has become common for various types of online service providers to implement data centers having large numbers of computers and associated resources. In some situations, a data center may be built to provide particular services that are associated with a website or entity. In other situations, a data center may support a number of services that are associated with various websites and different entities. In some situations, network-accessible data centers may provide relatively low level computing resources that can be utilized by developers for various purposes on a pay-per-use basis.

In large data centers, it can be challenging to keep track of resources and various operations performed with respect to those resources. As new resources are received by a data center, it may be necessary to log their receipt and physical installation. In addition, data center technicians from time to time may need to record diagnostic data, maintenance procedures, and other information relating to individual resources or groups of resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes, in part, architectures and techniques for presenting and logging information regarding multiple resources that may be located throughout a physical installation that supports online computing applications, operations, and/or services. Support personnel may use a handheld device or other portable device to gather and display information about individual resources. The portable device may use a graphical web browser or other client application in conjunction with a remote administrative service to interact with support personnel.

In order to perform management functions with respect to individual resources, a technician may use the browser or other client application operating on the portable device to navigate to a particular web page that is available from the administrative service. Such a web page may cause the web browser to download a resource management application, and to execute the application.

The administrative service may maintain a base or back-end data store with various information relating to different resources. The resource management application executed by the technician's web browser may maintain a local data store containing similar information about certain resources. The locally stored information may be a subset of the information that is stored in the base or back-end data store.

The technician may use the portable device and the resource management application to display and update information relating to resources. The resource management program may be designed to work with information from its local data store, so that work can be performed when the portable device is offline, and is not able to communicate with the administrative service. When a data connection to the administrative service is available, the local data store is synchronized with a base data store maintained by the administrative service.

The resource management program may be implemented as an offline web application, using Internet technologies such as HTML5 (Hypertext Markup Language version 5), javascript, Flash®, etc. The local data store may be implemented using persistent local storage capabilities, referred to as web storage by the HTML5 specification. The offline web application may be used for interacting with a user, occasionally updating the base data store to reflect new information recorded by the local data store, and to update the local data store with any changes that are made in the base data store.

Figure 1:
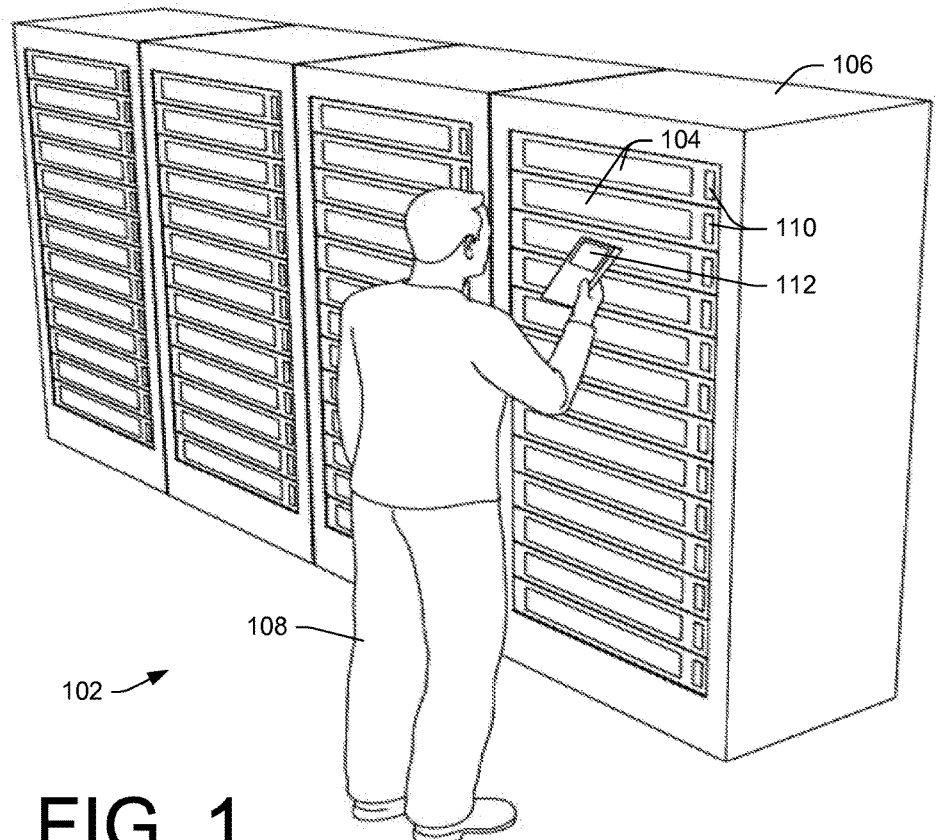
FIG. 1 is a diagram illustrating a data center environment in which technicians manage and maintain data center resources.
Figure 2:
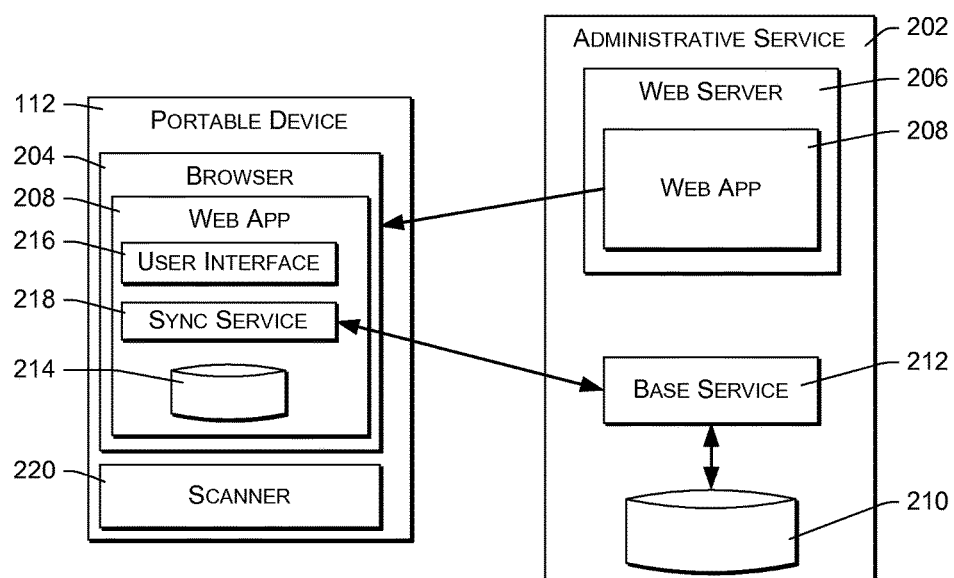
FIG. 2 is a block diagram illustrating components that may be used within a data center for administration and management of data center resources.

FIGS. 1 and 2 show an example environment in which the described techniques may be implemented. Referring first to FIG. 1, the example environment comprises a data center 102, which may be a physical facility that houses multiple resources 104, such as computers, telecommunications devices, networking components, power supplies, cooling equipment, and so forth. Generally, the described techniques may be used in installations that provide or support various types of online products and services, such as, for example, document storage, script-based video games, online email, infrastructure-as-a-service (IaaS), and so forth.

The resources 104 may be housed in rows or grids of similar or identical equipment racks 106, and the equipment racks themselves may be considered to be resources. The data center 102 may be housed in a room, a building, or a compound that includes multiple buildings.

The data center 102 may be staffed by one or more support personnel 108, who will be referred to as support technicians 108 in the following discussion. The support technicians 108 have physical access to the data center 102, to the equipment racks 106, and to individual resources 104 within the data center 102.

The racks 106 and other resources 104 may be visually and/or electronically labeled with various identifiers or tags 110, which may include serial numbers, barcodes, names, identification numbers, RFID (radio-frequency identification) tags, MAC (media access control) addresses, and other identifiers.

The technicians 108 may use a handheld or portable device 112 to assist in performing various diagnostic, informational, and administrative tasks. The portable device 112 may be a general-purpose device, such as a laptop computer, a tablet computing device, personal digital assistant (PDA), or smartphone, upon which applications may be installed and executed. In some embodiments, the portable device 112 may be a dedicated-purpose device, designed with specific features for supporting the tasks of technicians within a data center.

FIG. 2 illustrates relevant details regarding the portable device 112, as well as illustrating an administrative service 202 that may be implemented in conjunction with the data center 102. The administrative service 202 may be used by the data center technicians 108 and other users to manage aspects of the data center 102 and its resources 104. For example, the administrative service 202 may maintain status information about resources, such as identifications, capabilities, physical locations, operating parameters, network communications settings, runtime statuses, options, and so forth. As another example, the administrative service 202 may manage tasks that are to be performed with respect to resources 104, and may direct technicians to perform certain tasks by displaying those tasks on the portable devices 112 used by the technicians.

The administrative service 202 is representative of various different and possibly interacting management components and subcomponents that may be used within and across different types of facilities and organizations. Environments such as shown in FIGS. 1 and 2 may in practice have a number of management and reporting components. Such components may have overlapping functionality, and different management components may share and use information from the same resources and sub-components.

The technicians 108 may interact with the administrative service 202 using the portable device 112. In the described embodiment, the portable device 112 has a network browser 204 that is either integrated with the device 112 or that has been installed on the device 112. The network browser 204 may, for example, be a graphical web browser that allows a user to access and navigate various network-accessible websites and other resources. In certain embodiments, the network browser 204 may comprise an HTML5-compatible browser. Other types of client software may alternatively be installed on the portable device 112 and used to interact with the administrative service 202. Communications may be provided by wired or wireless networking capabilities of the portable device 112, or by other communications technologies. Such communications may be available sporadically in some environments, such as when wireless connectivity is available only in parts of a data center. At other times, the portable device 112 may operate offline.

In the illustrated example, the browser 204 communicates with a website or web server 206 that is implemented and/or maintained by the administrative service 202. The web server 206 may expose various functionality to the technician 108. For example, the technician 108 may use the browser 204 to access the web server 206, and to thereby configure, monitor, and diagnose different resources 104.

In the illustrated example, the web server 206 may be configured to provide or serve a web application 208 to the browser 204. The web application 208 may comprise an offline application, and may be implemented using Internet technologies such as HTML5. The web application 208 may comprise a number of source files or objects, which may include HTML (Hypertext Markup Language), CSS (Cascading Style Sheets) and Java Script objects. An offline application such as this can operate and interact with the user 108 and perform other local operations during periods when the portable device 112 is unable to communicate with the administrative service, e.g., in the instance where a connection to a wired and/or wireless network is unavailable.

In operation, the web server 206 may receive an HTTP request from the network browser 204, and may respond by sending one or more of the source files or objects to the network browser. For example, the web server 206 may send a javascript or HTML5 object to the network browser 204. The network browser may execute the javascript or HTML5 object.

The administrative service 202 may maintain a base data store 210 containing various information relating to different resources 104 within the data center 102. Such information may comprise static and dynamic information, including identifications, capabilities, physical locations, operating parameters, network communications settings, runtime statuses, options, and so forth.

The administrative service 202 may provide a base service or API 212, which can be accessed through network calls to access resource information that is stored in the base data store 210. Specifically, the web application 208 may call the base service 212 to obtain and/or update resource information that is stored by the base data store 210.

The administrative service 202 may provide additional services and functionality, in addition to those described herein. For example, the administrative service 202 may implement workflow management, such as by directing technicians to perform certain tasks and recording the results or completion of those tasks. Workflow and task status information may be maintained within the base data store 210 for access by browsers 204 and other data center components.

The base data store 210 is representative of a plurality of information sources and stores that may exist within a particular enterprise. The base data store 210 also represents information that may be obtained dynamically, such as information that may be obtained by querying or communicating in real time with resources and other components. Similarly, the base service 212 may in some situations be implemented by multiple components, services, and sources.

In use, the web application 208 may be downloaded and executed by the web browser 204 of the portable device 112. In the described implementation, the web application 208 may have at least three primary functionalities: a browser or browser-based data store 214, a user interface 216, and a synchronization service 218.

The browser data store 214 may be implemented by Internet-related application technologies, such as web storage defined by the HTML5 standard. In the described embodiment, the browser data store 214 may be local to the portable device 112, and may be implemented so that it is persistent across browser sessions and across instances of the browser 204.

The user interface 216 may be configured to receive user input from the technician 108 or other users and convey information to the technician 108 or other users. For example, the user interface 216 may display resource information to the technician 108 and accept new information from the technician 108 regarding individual resources 104. The user interface 216 may also interact with the technician 108 in different ways, such as by directing the technician 108 to perform certain tasks with respect to specified resources, querying the technician about particular resources, and so forth. The web application 208 may be used as part of a workflow management system, to coordinate efforts of multiple technicians 108 and to provide updated information about the data center 102 and the resources 104 within the data center 102.

The synchronization service 218 may be configured to communicate with the base service 212 to exchange resource information between the base service 212 and the browser data store 214. The synchronization service 218 may be configured to act asynchronously with respect to the user interface 216. The synchronization service 218 may be configured to cache a subset of the information stored by the base data store 210, and to synchronize any changes in the information between the browser data store 214 and the base data store 210.

Synchronization may take place at times when communications are possible between the portable device 112 and the administrative service 202. For example, the portable device 112 may communicate with the administrative service 202 over a wired network, which may be available only at times when the portable device 112 is physically connected to the network. As another example, the portable device 112 may utilize wireless networking for communications with the administrative service 202, and the wireless network may only be available at certain locations within the data center 102. In either of these situations, there may be times when communications are not possible between the portable device 112 and the administrative service 202.

The portable device 112 may in some implementations have or be associated with a resource tag scanner 220 such as an optical scanner, a barcode scanner, an RF scanner, or similar element that can be used by a technician to read, scan, and/or decode the resource identification tags 110 associated with the resources 104 within the data center 102. The scanner 220 may be part of the portable device 112 or may be an external device that is associated with and/or communicates with the portable device 112. In the same, or another embodiment, the technician 108 could use the user interface 216 to input identification tags 110 into the web app 208.

Figure 3:
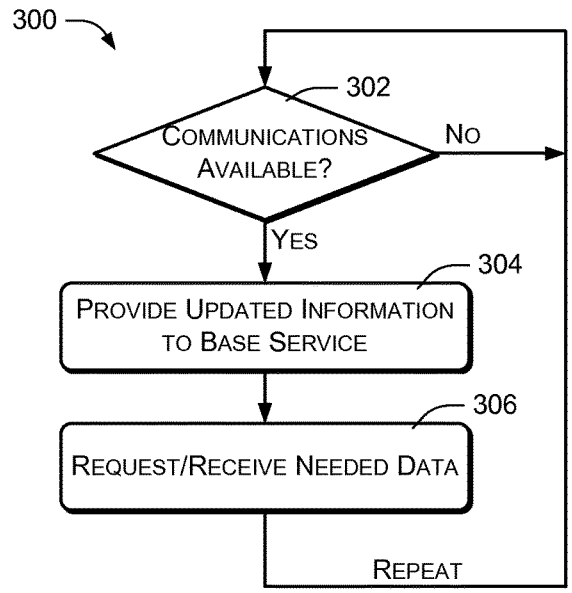
FIG. 3 is a flow diagram illustrating an example method of synchronizing between a portable device and an administrative component in a data center.

FIG. 3 illustrates an example method 300 of asynchronous communications between the portable device 112 and the administrative service 202 for synchronizing the browser data store 214 and the base data store 210. The example method 300 may be performed by the synchronization service 218 that is implemented by the web application 208.

The example method 300 begins with an action 302 of determining whether communications are available between the web browser 204 and the base service 212. If communications are not available, as indicated by the "No" branch from action 302, this action is repeated in a loop. If communications are available, the example proceeds with an action 304 as indicated by the "Yes" branch from action 302.

As an example of detecting whether communications are available, the web application 208 may include code for detecting network availability. For example, the code may periodically try to send or receive a heartbeat signal. As another example, the code may register with the operating system of the portable device 112 to receive event notification when network connectivity is established and/or lost.

The action 304 comprises providing any information that has been updated within the browser data store 214 to the base data store 210. This may be performed by making appropriate network or API calls to the base service 212.

An action 306 may comprise requesting and/or receiving any data that is needed by the web application 208 and/or any data held by the browser data store 214 that has changed within the base data store 210.

Generally, the data requests and transfers represented by the actions 304 and 306 may be referred to as synchronization or transfer cycles. Transfer cycles may be repeated in different ways and in response to various conditions whenever communications are available between the web browser 204 and the base service 212. For example, transfer cycles may be performed at periodic intervals during periods when such communications are available. Alternatively, transfer cycles may be performed upon modification by the web application 208 of data within the browser data store 214, or upon changes in data stored by the base data store 210. Furthermore, such exchanges may be initiated by either the portable device 112 or the administrative service 202, and individual transfer cycles may involve providing information to the administrative service 202, receiving information from the administrative service 202, or both providing and receiving information.

An initial data request 306 might involve a subset of data stored by the base data store 210. For example, the web application 208 may attempt to predict and obtain data that will be needed by the user interface 216. This might include data relating to the technician 108, to responsibilities that have been assigned to the technician 108, or to resources for which the technician 108 is responsible. Such data may be retrieved prospectively and stored in the browser data store 214 for potential future use by the web application 208 and technician 108.

Subsequent data requests 306 might specify further data, based on new information known to the web application 208 such as new work orders assigned to the technician 108 or specific requests and/or activities performed and recorded by the technician 108. Ongoing data requests 306 may also include any data held by the browser data store 214 that has become inconsistent with data held by the base data store 210, such as by changes to the base data store 210, including modifications, additions, and deletions to the base data store 210.

Similarly, providing updated information from the web browser 204 to the administrative service 202, as indicated by block 304, may be performed in response to any modifications, additions, and deletions to the browser data store 214.

In some embodiments, timestamps may be associated with data to indicate the times of their most recent updates. For example, a timestamp may be associated with each record or field of the base data store 210, indicating the time at which it was most recently updated. Similar timestamps may be associated with data fields of the browser data store 214. Such timestamps may be used to facilitate data synchronization by comparing the timestamps of the base data store 210 with the timestamps of the browser data store 214.

As another example, both the base data store 210 and the browser data store 214 may maintain timestamped logs of changes. Each entry, for example, may describe a change that was made to the data store and the time at which the change was made. Upon establishing communications, the logs may be examined to determine which parts of the respective data stores need to be updated.

Figure 4:
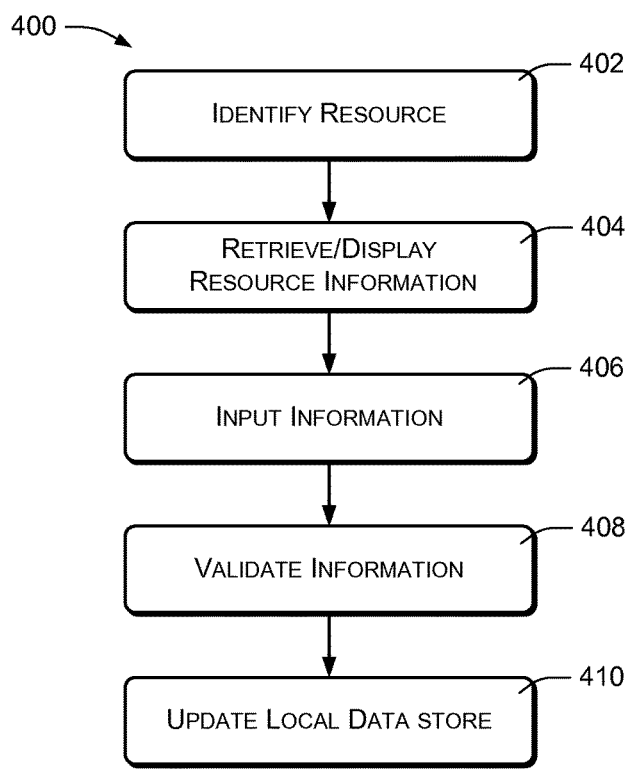
FIG. 4 is a flow diagram illustrating an example method of updating resource information using a portable device within a data center.

FIG. 4 shows an example method 400 of how the portable device 112 may operate in response to execution of the web application 208. An action 402 may comprise identifying a particular resource 104 or group of resources. This may be performed by prompting the technician 108 for an identification, or by scanning the identification tag 110 of a resource 104, using the tag scanner 220 associated with the portable device 112.

An action 404 may comprise retrieving and/or displaying information about the identified resource 104. This may comprise accessing or querying the browser data store 214, which has been prospectively initialized with information about resources expected to be displayed to the technician 108. In some cases, the information may not be available from the browser data store 214, and the user interface 216 may indicate this fact to the technician 108. This condition may also be indicated to the synchronization service 218, which may attempt to obtain the information from the base data store 210 during its next asynchronous data request 306. Furthermore, a data request 306 may be initiated in some embodiments directly in response to this situation. In cases where there is existing data connectivity, the requested information may be obtained from the base data store 210 relatively quickly, and may be presented to the technician 108 without perceptible interruption.

An action 406 may comprise inputting or receiving information regarding the identified resource. Such information may be entered manually by the technician 108. Alternatively, resource information may be collected or obtained by connecting the portable device 112 to the resource or by using diagnostic capabilities of the portable device 112.

In some cases, the display/input cycle represented by blocks 404 and 406 may comprise prompting the technician to perform a specified task with respect to a specified resource, and accepting an indication by the technician that the task has been completed.

An action 408 comprises validating any information provided or input by the technician. This may involve range checking, type verification, and other types of data validation.

An action 410 comprises updating the browser data store 214 in accordance with any new information that has resulted from preceding actions, such as any new information input in the action 406.

The actions of FIG. 4 may be repeated numerous times in response to activities of the technician 108.

Figure 5:
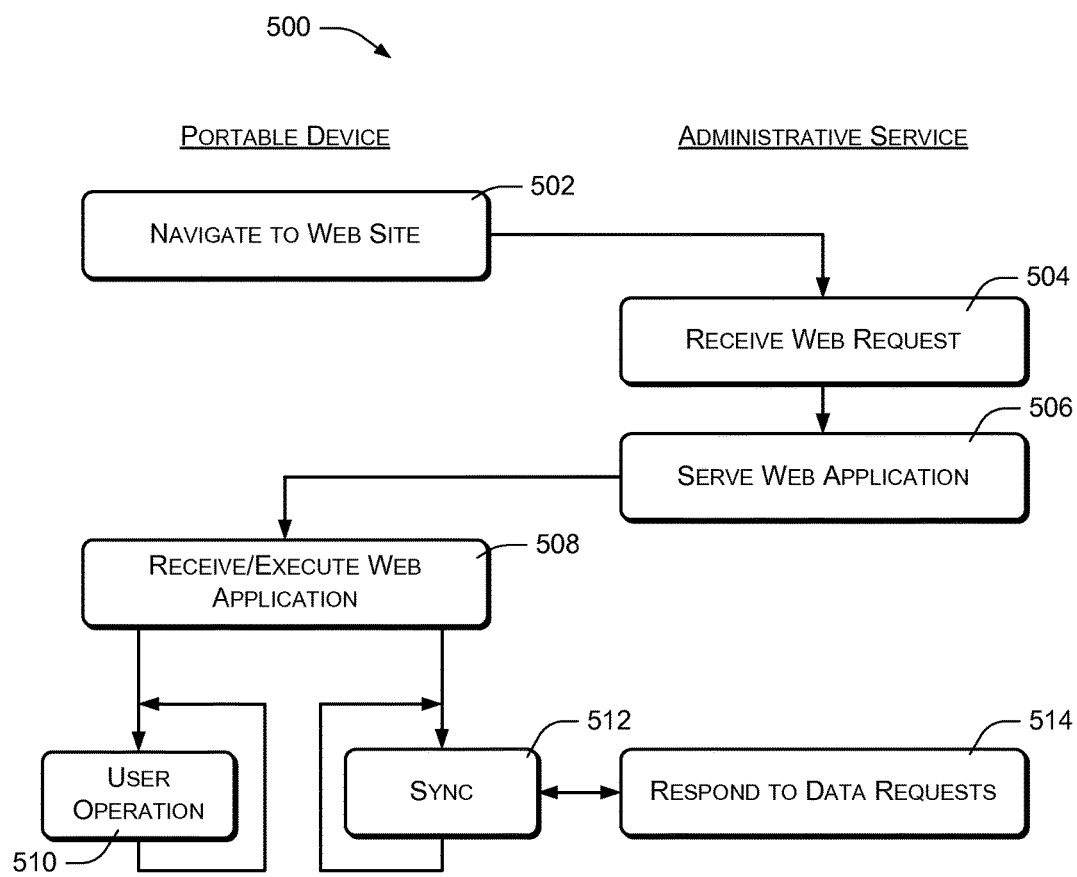
FIG. 5 is a flow diagram illustrating an example method of maintaining and updating resource information within a data center.

FIG. 5 illustrates an example method 500 that includes interactions between the portable device 112 and the administrative service 202. Actions on the left side of FIG. 5 are performed by web application 208, which is in turn executed by the web browser 204 of the portable device 112. Actions on the right side of FIG. 5 are performed by the administrative service 202.

An action 502 comprises navigating from the web browser 204 to the web site or web server 206 of the administrative service 202. An action 504, performed by the administrative service 202, comprises receiving a web request from the portable device 112. In response, an action 506 comprises serving the web application 208 to the portable device 112.

An action 508, performed by the portable device 112, comprises receiving and executing the web application 208. The web application 208 performs a user operation action 510 and a data synchronization action 512 asynchronously with respect to each other. The user operation action 510 may comprise the example method 400 of FIG. 4. The data synchronization action 512 may comprise the example method 300 of FIG. 3, which may include initializing or preloading the browser data store 214. In conjunction with the data synchronization action 512, the base service 212 performs an action 514 of responding to any data requests that are received from the portable device 112.

Figure 6:
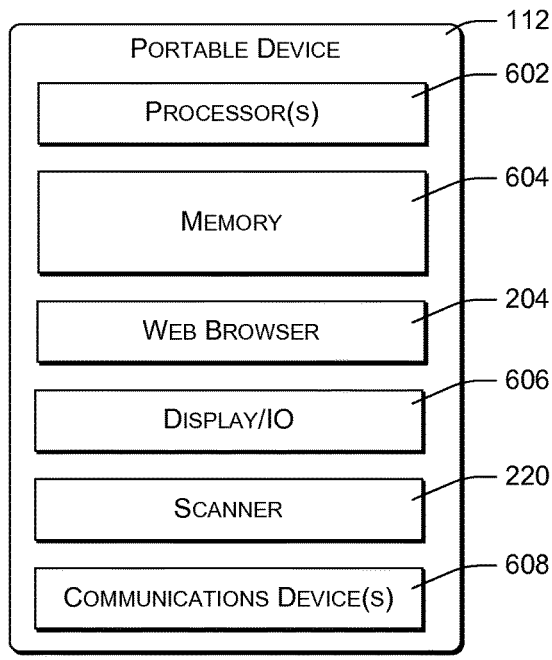
FIG. 6 is a block diagram of a portable or handheld diagnostic device that may be used by a technician within a data center.

FIG. 6 illustrates relevant components of an example handheld or portable device 112. The portable device 112 may be a general-purpose device upon which specialized applications can be installed for custom functionality. In a very basic configuration, the example device 112 might comprise a processing unit 602 composed one of one or more processors, and memory 604. The memory 604 may comprise computer storage media and may include volatile and nonvolatile memory. Thus, the memory 604 may include, but is not limited to, RAM, ROM, EEPROM, flash memory, or other memory technology, or any other medium which can be used to store media items or applications and data which can be accessed by the device 112.

The memory 604 may be used to store any number of functional components that are executable on the processing unit 602, as well as data that is used by the functional components. Functionality components (not shown) may include an operating system, a web services component, application program interfaces (APIs) and various other components.

In particular, the portable device 112 may include the web browser 204, which may execute downloaded web applications. The web browser 204 may comprise an Internet browser or a similar interface, which may be used to execute the web application 208.

The portable device 112 may include a display and other I/O components 606. The portable device 112 may include the scanner 220 such as an optical scanner, a barcode scanner, an RF scanner, or similar element that can be used by a technician to read, scan, and/or decode identifiers associated with resources within a data center. The scanner 220 may be part of the portable device 112 or may be an external device that is associated with and/or communicates with the portable device 112.

The portable device 112 may also have one or more communications components or devices 608, such as a network adapter, for communicating with the administrative service 202 and other system components. The communications component 608 may use wireless technology, including wireless networking technology. The communications components 608 may, as another example, include a Bluetooth® device, which may be used to communicate with peripherals such as the scanner 220.

The portable device 112 may of course include many other logical, programmatic, and physical components, of which those shown in FIG. 6 are merely examples that are related to the discussion herein.

Figure 7:
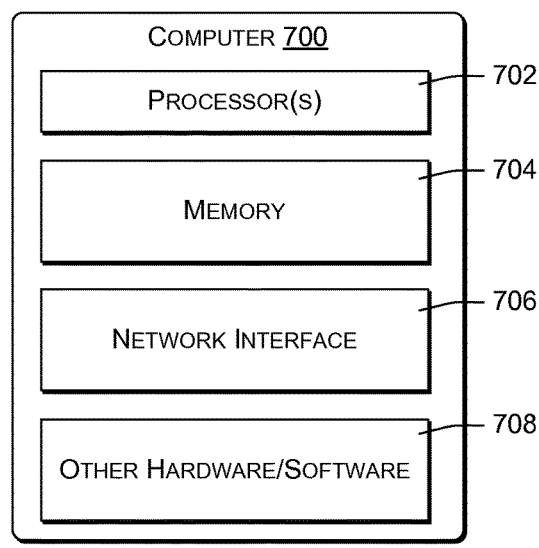
FIG. 7 is a block diagram showing high-level components of an example computer that may be configured and programmed to implement portions of the functionality described herein.

FIG. 7 illustrates relevant components of an example computer configuration that may be used to implement aspects of the functionality described above, including functionality attributed above to management components such as the administrative service 202. Generally, a server, service, web site, etc. may be implemented by one or more computers such as this, with the various management and administrative functionality described above distributed in various ways among one or more instances of such computers.

In a very basic configuration, an example computer 700 might comprise a processing unit 702 composed one of one or more processors, and memory 704. The memory 704 may comprise computer storage media and may include volatile and nonvolatile memory. Thus, the memory 704 may include, but is not limited to, RAM, ROM, EEPROM, flash memory, or other memory technology, or any other medium which can be used to store media items or applications and data which can be accessed by the computer 700.

The memory 704 may be used to store any number of functional components that are executable on the processing unit 702, as well as data that is used by the functional components. Functionality components (not shown) may include an operating system, a web services component, application program interfaces (APIs) and various other components as may be appropriate to implement the functionality described above.

The computer 700 may of course include many logical, programmatic, and physical components, of which those shown in FIG. 7 are merely examples that are related to the discussion herein. As an example, the server 700 may have a network interface 706 for communicating with devices such as the portable device 112. Other hardware and software components of the server 700 are represented by block 708 of FIG. 7, and may include the usual components of a network-based computer or server.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media containing a web application that is executable by a web browser, the web application comprising instructions that are executable by one or more processors to perform actions comprising:
   initializing a local browser-based data store on a portable device from a base data store remote from the local browser-based data store with information regarding multiple local data center resources,
      wherein the resources are located at different respective locations throughout a physical data center remote from the base data store, the resources providing online computing services from the data center, and
      wherein initializing the local browser-based data store includes:
         predicting, with the web application, data related to data center resources for which a technician is responsible, and
         receiving the predicted data from the base data store;
   displaying at least a portion of the predicted data with the portable device via the web application;
   scanning a resource identifier with the portable device to identify a particular one of the data center resources;
   in response to the scanning, updating information in the local browser-based data store regarding the particular data center resource based at least in part on data communications with the base data store being unavailable; and
   asynchronously updating the base data store with the updated information in the browser-based data store based at least in part on data communications with the base data store being available.

2. The one or more computer-readable media of claim 1, the actions further comprising asynchronously updating the browser-based data store to reflect changes to the base data store.

3. The one or more computer-readable media of claim 1, wherein the information regarding multiple local data center resources is stored in the base data store, and wherein asynchronously updating the base data store comprises synchronizing the information regarding multiple local data center resources stored in the base data store with the updated information.

4. The one or more computer-readable media of claim 1, the actions further comprising:
   displaying the updated information on the portable device while communications between the web browser and the base data store are unavailable;
   caching at least a portion of the updated information in the browser-based data store; and
   asynchronously updating the base data store with the portion of the updated information while communications between the web browser and the base data store are available.

5. The one or more computer-readable media of claim 1, further comprising displaying information on the portable device directing the technician to perform a task with respect to the particular data center resource, the actions further comprising accepting an indication that the task has been completed.

6. The one or more computer-readable media of claim 1, the actions further comprising:
   retrieving the predicted data from the base data store prior to scanning the resource identifier;
   storing the predicted data in the browser-based data store; and
   updating the predicted data at least partly in response to the scanning.

7. The one or more computer-readable media of claim 6, the actions further comprising accessing the stored predicted data with the web application while communications between the web browser and the base data store are unavailable.

8. The one or more computer-readable media of claim 1, wherein the web application comprises a component of a workflow management system, the web application providing instructions, regarding the resources, to multiple technicians.

9. The one or more computer-readable media of claim 8, wherein the technicians receive the instructions, via respective portable devices, at different respective locations throughout the data center.

10. The one or more computer-readable media of claim 1, the actions further comprising at least one of configuring or diagnosing the particular one of the data center resources, with the portable device at the data center, for providing the online computing services.

11. The one or more computer-readable media of claim 1, wherein updating information in the local browser-based data store further comprises physically connecting the portable device to an additional one of the data center resources, and obtaining information indicative of operating parameters of the additional one of the data center resources while the portable device is physically connected to the additional one of the resources.

12. The one or more computer-readable media of claim 1, wherein scanning the resource identifier includes obtaining diagnostic information of the particular one of the data center resources associated with providing the online computing services.

13. A method implemented by a graphical browser of a portable device, the method comprising:
   under control of one or more processors of the portable device configured with executable instructions,
   executing, by the graphical browser of the portable device, a web application that includes a local browser-based data store;
   predicting, with the web application, data related to local resources for which a technician is responsible;
   receiving, by a user interface of the web application, information regarding local resources, the information including the predicted data;
   displaying at least a portion of the predicted data with the portable device via the web application;
   updating information stored in the local browser-based data store in response to at least a determination that data communications with a base service are unavailable, wherein the resources are located at different respective locations throughout a physical data center, the resources providing online computing services from the data center; and
   asynchronously updating a base data store, remote from the local browser-based data store and the data center, with the updated information stored in the local browser-based data store in response to at least a determination that data communications with the base service are available.

14. The method of claim 13, further comprising asynchronously updating the browser-based data store to reflect changes to the base data store.

15. The method of claim 13, further comprising prospectively updating the browser-based data store from the base data store.

16. The method of claim 13, further comprising prospectively updating the browser-based data store with a subset of data stored by the base data store.

17. The method of claim 13, further comprising prospectively initializing the browser-based data store from the base data store with the predicted data.

18. The method of claim 13, wherein the executing, receiving, and updating the information stored in the local browser-based data store are performed locally while the web application is offline.

19. The method of claim 13, wherein a synchronization service of the web app is configured to asynchronously update the base data store when communications are available between the graphical browser and the base data store.

20. The method of claim 13, further comprising identifying a particular resource of the resources, and directing a technician using the portable device to perform a task with respect to the particular resource.

21. A method comprising:
   under control of one or more processors configured with executable instructions, providing a browser-based application to requesting clients remote from the one or more processors; and
   predicting, with the browser-based application, data related to data center resources for which a user is responsible, the browser-based application being executable by the clients to perform actions comprising:
      receiving information regarding multiple local data center resources, the information including the predicted data,
      storing the information in a local browser data store, wherein the resources are located at different respective locations throughout a physical data center, the resources providing online computing services from the data center,
      displaying at least a portion of the predicted data to the user,
      interacting with the user to update the information stored in the local browser data store regarding the multiple data center resources based at least in part on data communications with a base data store, remote from the local browser data store and the data center, being unavailable, and
      asynchronously updating the base data store and the data center with the updated information stored in the local browser data store based at least in part on data communications with the base data store being available.

22. The method of claim 21, the actions further comprising asynchronously updating the browser data store to reflect changes to the base data store.

23. The method of claim 21, wherein the browser-based application comprises an offline browser-based application.

24. The method of claim 21, the actions further comprising executing a synchronization service to perform the asynchronous updating when communications with the base data store are available.

25. The method of claim 21, the actions further comprising:
   caching the updated information in the browser data store when communications with the base data store are not available; and
   updating the base data store with the cached updated information when communications with the base data store are available.

26. The method of claim 21, the actions further comprising scanning the data center resources to identify individual data center resources, wherein the interacting with the user is in response to identifying a particular data center resource.

27. The method of claim 21, the actions further comprising receiving resource identifiers of the data center resources to identify individual data center resources, wherein the interacting with the user is in response to identifying a particular data center resource.

* * * * *